(12) United States Patent
Mikula et al.

(10) Patent No.: US 8,895,656 B2
(45) Date of Patent: Nov. 25, 2014

(54) COLD SEAL ADHESIVE FOR PRODUCT PACKAGING

(71) Applicants: Shane Mikula, Naperville, IN (US); Scott Burless, Plano, IL (US)

(72) Inventors: Shane Mikula, Naperville, IN (US); Scott Burless, Plano, IL (US)

(73) Assignee: Excel Retail Solutions, LLC, Aurora, IL (US)

( * ) Notice: Subject to any disclaimer, the term of this patent is extended or adjusted under 35 U.S.C. 154(b) by 67 days.

(21) Appl. No.: 13/729,254

(22) Filed: Dec. 28, 2012

(65) Prior Publication Data

US 2013/0281597 A1 Oct. 24, 2013

Related U.S. Application Data

(60) Provisional application No. 61/636,210, filed on Apr. 20, 2012, provisional application No. 61/636,226, filed on Apr. 20, 2012, provisional application No. 61/636,233, filed on Apr. 20, 2012.

(51) Int. Cl.
  *C09J 107/02* (2006.01)
  *C09J 121/02* (2006.01)

(52) U.S. Cl.
  USPC .......................... 524/528; 427/541; 427/542

(58) Field of Classification Search
  CPC .... C09J 107/02; C09J 121/02; B32B 38/0012
  USPC .................................. 524/528; 427/541, 542
  See application file for complete search history.

(56) References Cited

U.S. PATENT DOCUMENTS

| | | | |
|---|---|---|---|
| 2,637,251 A | 5/1953 | Spiess | |
| 3,224,159 A | 12/1965 | Pitt et al. | |
| 3,924,747 A | 12/1975 | Gerner | |
| 4,430,843 A | 2/1984 | Favale | |
| 4,804,573 A * | 2/1989 | McCarthy et al. | 428/201 |
| 4,810,745 A * | 3/1989 | Pike et al. | 524/516 |
| 4,902,370 A * | 2/1990 | Dust et al. | 156/327 |
| 5,014,851 A | 5/1991 | Wick | |
| 5,704,481 A | 1/1998 | Lutz | |
| 6,085,904 A | 7/2000 | Perdue, Jr. | |
| 6,126,584 A | 10/2000 | Zadravetz | |
| 6,308,832 B1 | 10/2001 | Pirro et al. | |
| 6,719,139 B1 | 4/2004 | Foos et al. | |
| 6,736,267 B2 | 5/2004 | Schamante | |
| 7,207,441 B2 | 4/2007 | Ritter | |
| 7,681,733 B2 | 3/2010 | Grosskopf | |
| 7,726,480 B2 | 6/2010 | Nazari | |
| 8,205,746 B2 | 6/2012 | Nazari | |
| 8,205,747 B2 | 6/2012 | Nazari | |
| 8,616,372 B2 | 12/2013 | Wills | |
| 2005/0196630 A1 | 9/2005 | Carper | |
| 2006/0028014 A1 | 2/2006 | McQueeny et al. | |
| 2006/0207909 A1 | 9/2006 | Tada et al. | |
| 2007/0187264 A1 | 8/2007 | Hofte et al. | |
| 2007/0209957 A1 | 9/2007 | Glenn et al. | |
| 2008/0029417 A1 | 2/2008 | Begim | |
| 2009/0101534 A1 | 4/2009 | Wills | |
| 2010/0105534 A1 | 4/2010 | Nazari | |
| 2010/0170821 A1 | 7/2010 | Grosskopf | |
| 2010/0230315 A1 | 9/2010 | Nazari | |
| 2010/0236723 A1 | 9/2010 | Nazari | |
| 2012/0228178 A1 | 9/2012 | Nazari | |

FOREIGN PATENT DOCUMENTS

| | | |
|---|---|---|
| GB | 1142773 | 2/1969 |
| WO | WO97/05038 | 2/1997 |

* cited by examiner

*Primary Examiner* — Robert D. Harlan
(74) *Attorney, Agent, or Firm* — Ice Miller LLP

(57) ABSTRACT

According to one aspect of the present disclosure, a cold seal adhesive material is disclosed. The cold seal adhesive material includes a latex emulsion comprising between 15 to 65 percent of the adhesive by weight and ammoniated water. The adhesive viscosity is between 10 and 450 centipoise at 25 degrees Celsius, the density is between 8.0 and 9.0 pounds per gallon at 25 degrees Celsius, and the basicity is between 9.5 and 12 pH. The adhesive is adapted to be applied as a film on a substrate by a modified flexographic printing press process at a rate of at least 1,750 square feet per minute of the substrate without agglomeration of the adhesive, where the film has a film weight between 0.01 and 0.04 grams per square inch of the substrate and must be compressed with a sealing pressure to produce a cohesive bond between two or more adhesive regions.

9 Claims, 16 Drawing Sheets

COLD SEAL ADHESIVE FOR PRODUCT PACKAGING

PRIORITY

The present application is related to, and claims the priority benefit of, U.S. Provisional Patent Application Ser. Nos. 61/636,210, 61/636,226, and 61/636,233, each filed Apr. 20, 2012. The contents of each of these applications are hereby incorporated by reference in their entirety into this disclosure.

BACKGROUND

Conventional packaging for the retail sale of consumer products has evolved to include display packs that not only allow unobstructed viewing of a product without opening the packaging, but also prevent tampering with the product, deter theft of the product, and limit retailer costs of an unsaleable product due to damage to the packaging. Among the types of consumer packaging developed to address these needs is a clear plastic blister pack in combination with a cardboard, corrugated fiberboard, or paperboard frame that encloses the outer edges of the blister pack. The product is enclosed inside the blister pack, and the combination of the blister pack and the corrugated frame prevents easy access to the product. This type of packaging deters theft by providing a bulky package, and it also provides a protective shield to the enclosed product while still allowing a consumer to view the product.

Traditionally, the corrugated frame used in combination with plastic blister pack is made up of two sheets of material adhered together with an adhesive, such as a hot melt glue, a heat-sensitive adhesive, or a cohesive contact adhesive. However, these adhesives and their respective application processes have several disadvantages. For instance, hot melt glues are typically difficult to apply in a controlled fashion and the quality of the resulting seal varies accordingly. Heat-sensitive adhesives often provide ineffective seals when used with corrugated substrates because the corrugated sheets are poor heat conductors. Such adhesives are also difficult to use in a high volume manufacturing process where corrugated frames must be stacked in an efficient manner because the adhesive is slow to dry and is also susceptible to smearing when coming into contact with another surface. Furthermore, as the corrugated frames are stacked higher and higher, the accumulation of weight in the stack increases the possibility of the frames adhering to each other once the adhesive has been applied. Finally, conventional cohesive contact adhesives also suffer from these and other drawbacks in that they are applied over the entire interior surface of the corrugated packaging, creating waste, slowing the production process, and inevitably leaving an undesirable adhesive residue on the plastic blister pack, which impacts the recyclability of the blister pack when separated from the corrugated frame.

The abovementioned conventional adhesives create excess waste both during the manufacturing process and once the product is removed from the packaging by a consumer. In recent years, there has also been an increased awareness of the environmental impact from the manufacture, use and disposal of product packaging. While both the plastic blister pack and corrugated frame used in conventional packaging are separately recyclable, the adhesive is not and can impact the recyclability of the rest of the packaging. It is therefore desirable to use an adhesive that causes a minimal environmental impact when disposed.

Accordingly, a need exists for a method of efficiently applying an adhesive for product packaging at high production rates that enables a combination plastic blister pack and corrugated product packaging container that is cost-effective to produce, environmentally friendly to manufacture and dispose, and sufficiently protects a product during shipping, handling, and display.

SUMMARY

According to one aspect of the present disclosure, a cold seal adhesive material is disclosed. The cold seal adhesive material includes a latex emulsion comprising between 15 to 65 percent of the adhesive by weight and ammoniated water. The adhesive viscosity is between 10 and 450 centipoise at 25 degrees Celsius, the density is between 8.0 and 9.0 pounds per gallon at 25 degrees Celsius, and the basicity is between 9.5 and 12 pH. The adhesive is adapted to be applied as a film on a substrate by a modified flexographic printing press process at a rate of at least 1,750 square feet per minute of the substrate without agglomeration of the adhesive, where the film has a film weight between 0.01 and 0.04 grams per square inch of the substrate and must be compressed with a sealing pressure between 50 and 1,000 pounds per square inch to produce a cohesive bond between two or more adhesive regions. In at least one embodiment, the substrate is a housing, the housing comprising at least two adhesive regions.

In at least one embodiment, the latex comprises between 45-58 percent of the adhesive by weight, the adhesive viscosity is 75 centipoise at 25 degrees Celsius, the adhesive density is between 8.3 and 8.7 pounds per gallon at degrees Celsius, and the adhesive basicity is between 10 and 11 pH. In at least one embodiment, the modified flexographic printing press process comprises an transfer roller having a transfer surface with a plurality of cells formed in the transfer surface, each of the plurality of cells having a volume of 1-100 billion cubic microns per square inch at a line screen density between 40-500 lines per linear inch. In at least one embodiment, the modified flexographic printing press process comprises an transfer roller having a transfer surface with a plurality of cells formed in the transfer surface, each of the plurality of cells having a volume of 30-50 billion cubic microns per square inch at a line screen density between 50-250 lines per linear inch.

In at least one embodiment, each the plurality of cells has a volume of approximately 40 billion cubic microns per square inch at a line screen density of approximately 60 lines per linear inch. In at least one embodiment, the transfer roller is an anilox roller.

In at least one embodiment, the sealing pressure is approximately 500 pounds per square inch. In at least one embodiment, the sealing pressure is less than 500 pounds per square inch.

BRIEF DESCRIPTION OF THE DRAWINGS

The described embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

Like reference numerals indicate the same or similar parts throughout the several figures.

Figure 1:
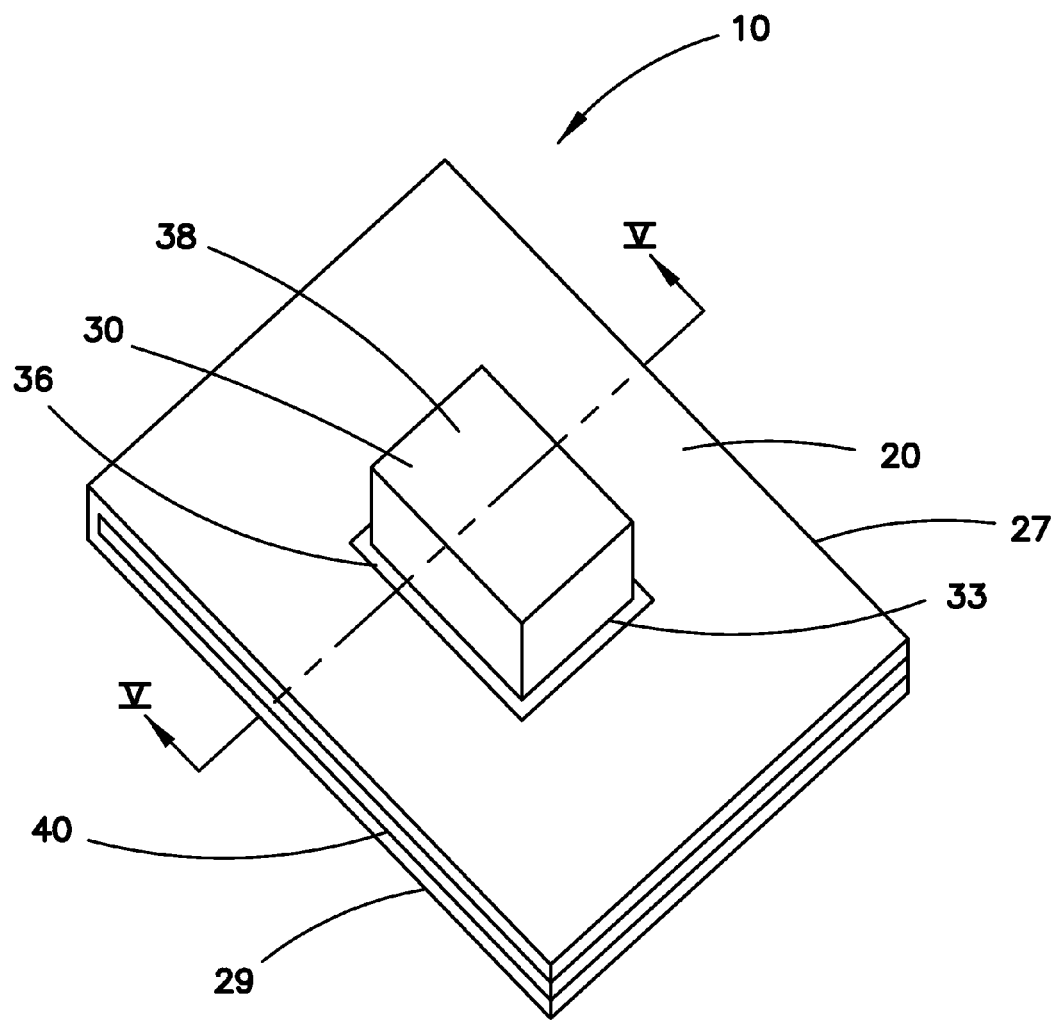
FIG. 1 shows a cold seal product packaging container according to the present disclosure.

An overview of the features, functions and configuration of the components depicted in the various figures will now be presented. It should be appreciated that not all of the features of the components of the figures are necessarily described. Some of these non-discussed features, such as various couplers, etc., as well as discussed features are inherent from the figures. Other non-discussed features may be inherent in component geometry or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The disclosure of the present application provides a unique cold seal adhesive for product packaging particularly suited for the manufacture a product packaging container. Such product packaging may be constructed of a corrugated fiberboard enclosure and a plastic blister pack and may employ the new cold seal adhesive and adhesive application process, which result in a container that is strong, tamper-proof, and recyclable and can be manufactured at a much faster rate than conventional product packaging. Though the product packaging container may be commonly used with retail consumer products, it will be appreciated that the product packaging container is not limited to use with these specific types of products or distribution outlets and, consequently, may be used to package any article. Further, though the cold seal adhesive may be particularly suited for product packaging, it will be appreciated that the cold seal adhesive is not limited to use in product packaging or to the specific product packaging container used to illustrate the process.

A cold seal adhesive for product packaging according to at least one embodiment of the present disclosure includes a quick-drying, latex-based adhesive that, once dried, will create a surface with essentially no tack and will only adhere to other surfaces coated with the same adhesive when placed under pressure. The cold seal adhesive is further capable of being applied to a substrate material at a relatively high rate of production and of being dried relatively quickly. As a result, the cold seal adhesive enables the manufacture of packaging materials for consumer products at production rates much faster than conventional adhesive materials used in the art. The cold seal adhesive may be applied using a high speed printing process to reduce film thickness of the adhesive to as little as 10-20% of conventional packaging adhesive, further enabling the manufacture of a product packaging container at production rates much faster than conventional adhesive materials used in the art. In additional, the properties of the cold seal adhesive enable further advantages and characteristics as described herein.

The cold seal adhesive is specially formulated to provide the characteristics described herein. The cold seal adhesive is an emulsion of natural and/or synthetic latex rubber in aqueous solution of ammoniated water with a solids content between 15 and 65 percent by weight. The viscosity of the cold seal adhesive may be between 10 and 450 centipoise (cP) at 20 revolutions per minute and 23 degrees Celsius (° C.) per ASTM D1084 Test Method B. Further, the density of cold seal adhesive may be between 8.0 and 9.0 pounds per gallon (lb/gal) at 25° C., and the basicity or pH may be between 9.5 and 12 pH. The composition of cold seal adhesive may contain dispersants, surfactants, tackifiers, isocyanates, antioxidants, and antifoaming agents, as is well known in the art, without deviating from the scope of the disclosure. In at least one embodiment of the present disclosure, cold seal adhesive has the following properties: the solids content is 57.5 percent by weight, the viscosity is 75 cP at 25° C., the density is 8.3 lb/gal, and the pH is 10.0. In at least one embodiment of the present disclosure, the adhesive has a solids content between 45 and 58 percent by weight, a viscosity between 75 and 200 cP at 23° C., a density between 8.3 and 8.7 lb/gal at ° C., and a basicity between 10 and 11 pH. Viscosity may be measured using ASTM D1084 Test Method B using a Brookfield viscometer or ASTM D1084 Method D using Zahn Cups.

Being a latex-based adhesive, the viscosity of the cold seal adhesive increases dramatically under processing conditions that induce shear stress in the adhesive, causing shear thickening or agglomeration. Likewise, the cold seal adhesive exhibits high shear viscosity, which is a measure of resistance to flow at the high shear rates, such as the shear rates induced by the application process. However, to reduce shear sensitivity, the cold seal adhesive has significantly lower viscosity and solids content than conventional cohesive adhesives used in the product packaging art. Further, the low viscosity and solids content enable the cold seal adhesive to be applied and effective at a film weight of between 0.01-0.04 grams per square inch ($g/in^2$) of substrate, and typically 0.015 $g/in^2$. Nonetheless, various processing issues must be overcome to prevent inducing shear stress in the adhesive and achieve the noted film thickness range during application at high production rates as described further herein.

The properties, application, and distinguishing advantages of the cold seal adhesive are best disclosed in relation to its use in product packaging. Accordingly, a product packaging container, methods of applying the cold seal adhesive, and a method of sealing a product packaging container, which include the cold seal adhesive, are disclosed.

FIG. 1 shows a cold seal product packaging container according to the present disclosure. As shown in FIG. 1, the product packaging container 10 includes a housing 20, which encloses and retains a product tray 30 and is sealed together with a cold seal adhesive 40. The container 10 is configured to enclose one or more articles (not shown), such as consumer products, within the tray 30 and to protect products from damage, blemish, or theft. To adequately protect the product, the adhesive 40 must seal the housing 20 around the edges of tray 30 with sufficient strength and durability to securely support the products' weight during shipping, handling, and display of the product and to discourage tampering with the container 10 and its contents. In FIG. 1, housing 20 is shown in a folded configuration as a part of the container 10, which is the final configuration once container 10 has been fully formed and sealed as described more fully herein.

Figure 2:
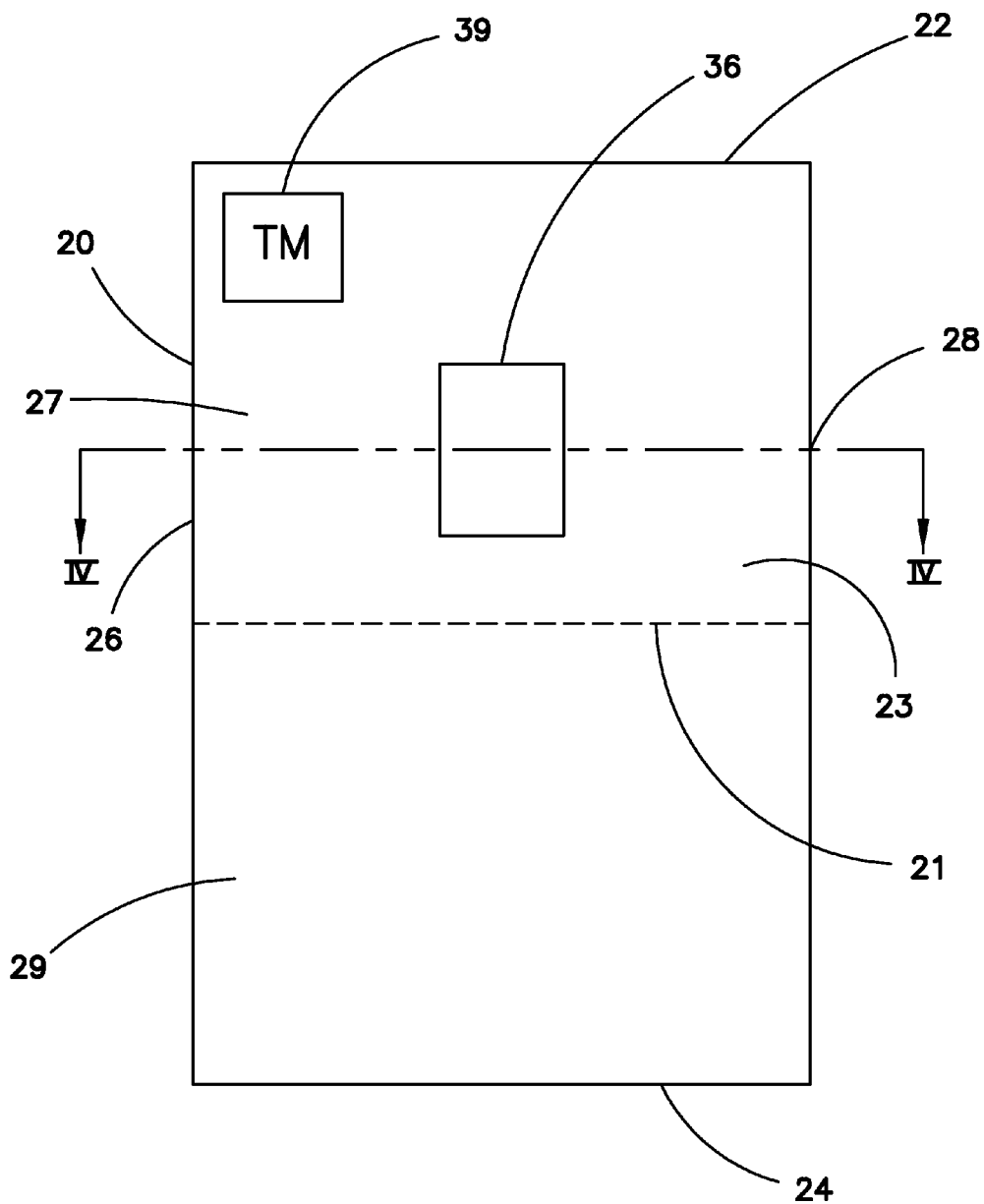
FIG. 2 shows a housing for a product packaging container according to the present disclosure.
Figure 3:
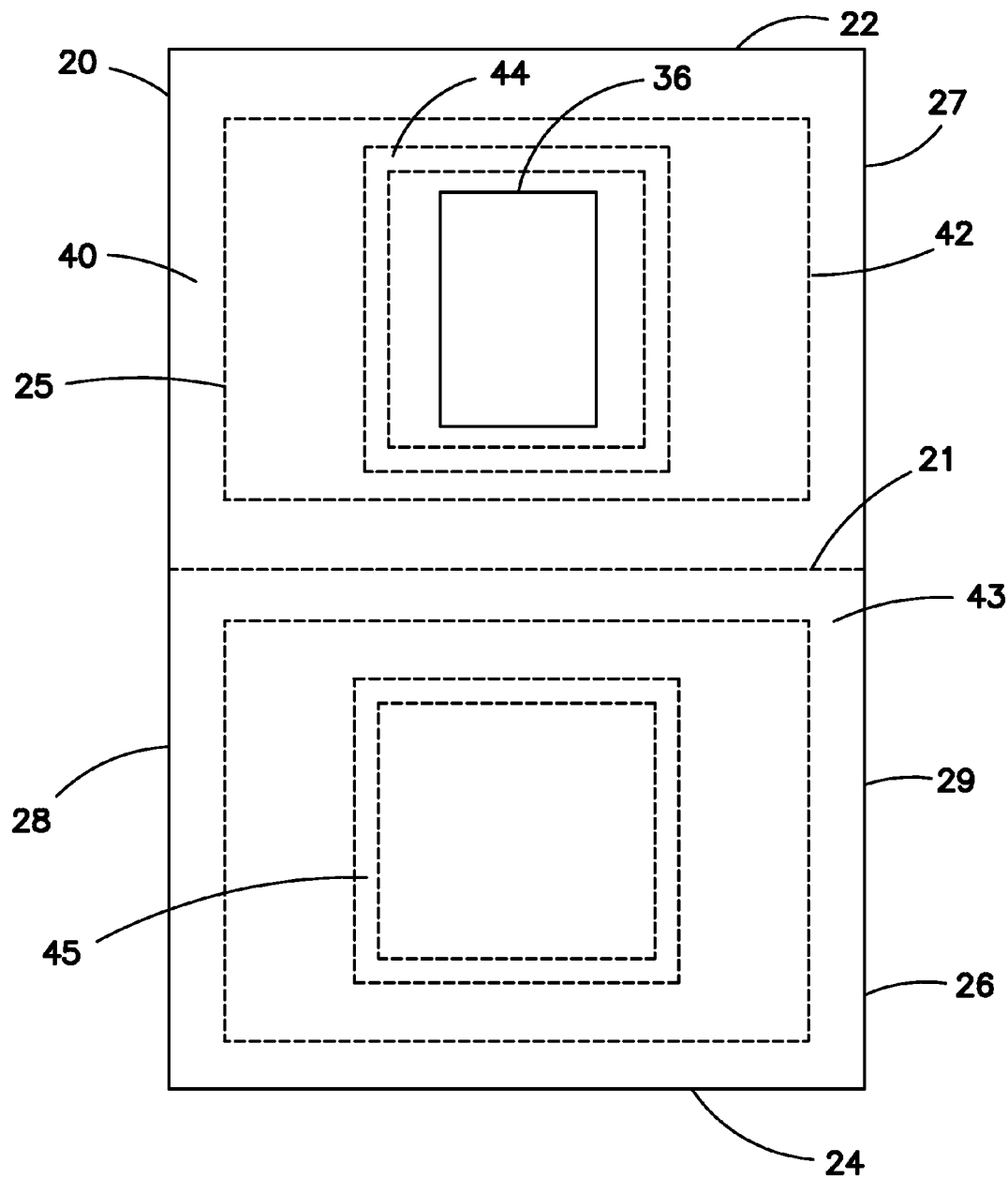
FIG. 3 shows a housing for a product packaging container according to the present disclosure.

Referring to FIGS. 2 and 3, housing 20 is initially manufactured in an unfolded configuration prior to assembly into the container 10 of FIG. 1. Alternatively, the housing 20 may be manufactured in a configuration of two separate sheets, a front sheet and a back sheet, that are assembled together. Accordingly, though the housing 20 is depicted as a single folded sheet, in at least one embodiment a two-sheet configuration is used. As shown in FIG. 3, the housing 20 may include an exterior surface 23 and an opposing interior surface 25 and may be bounded by a leading edge 22, trailing edge 24, a first side edge 26, and second side edge 28. Further, the housing 20 is capable of being folded at a score or perforated line of weakness 21 located substantially equidistant from leading edge 22 and trailing edge 24. The line of weakness 21 defines a top portion 27 and a bottom portion 29, which contact one another at the interior surface 25 when the housing 20 is in the folded configuration.

Figure 4:
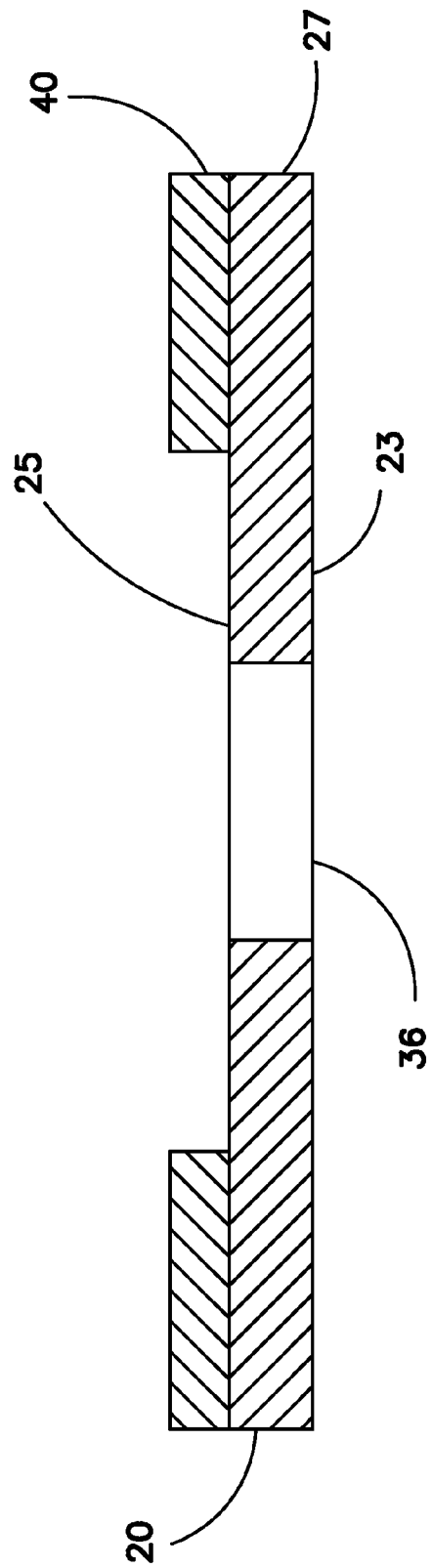
FIG. 4 shows a cross-sectional view of a housing for a product packaging container according to the present disclosure, taken across line IV-IV of FIG. 2.

According to at least one embodiment of a product packaging container according to the present disclosure as shown in FIG. 4, the housing 20 may include at least one opening 36 formed through the exterior surface 23 and/or the interior surface 25. As shown in FIG. 1, the opening 36 may be formed to accept the tray 30, whereby a suitable opening shape is formed as disclosed in more detail herein. Though the opening 36 is depicted as being formed through the top portion 27, the housing 20 may include one or more additional openings 36 formed in either the top portion 27 and/or the bottom portion 29. Further, the exterior surface 23 may include graphic indicia 39 identifying or advertising the product contained within container 10, displaying regulatory nutrition information, a Universal Product Code or matrix barcode, or any other information relevant to the product. The indicia 39 may be printed on the exterior surface 23 by any suitable process or may be applied as a label to the exterior surface 23. Though the housing 20 is shown in the Figures with a rectangular shape, the perimeter of the housing 20 could form any desired shape and size.

The housing 20 may be formed of corrugated fiberboard, such as E flute corrugated fiberboard, cardboard, chipboard, solid bleached sulphate (SBS) and other paperboards, corrugated plastic board, or any planar material suitable for the requirements of a product packaging container 10 as disclosed herein. The packaging container 10 may also be made using numerous other substrates for housing 20, such as 26 ECT E-flute, 26 ECT B-flute, 32 ECT E-flute, 32 ECT B-flute, 150 lb ECT E-flute, 150 lb test B-flute, 200 lb ECT E-flute, 200 lb test B-flute, and various microflutes (N&F), etc. Embodiments described herein we are not limited to corrugated cardboard, as conventional packages use corrugated cardboard for both "sheets" of their housing. Embodiments described herein may use virtually any paperboard substrate in any combination. For example, embodiments may use an E-flute backer card with a SBS or chipboard front card to form a housing 20 for package container 10. Approximately 20% of the marketplace uses corrugated/corrugated sheet combinations, whereas the remaining 80% of the marketplace uses either chipboard/SBS or some combination of chipboard/SBS and corrugated. Embodiments described herein may be used with more varieties of materials than conventional packaging provides.

Figure 5:
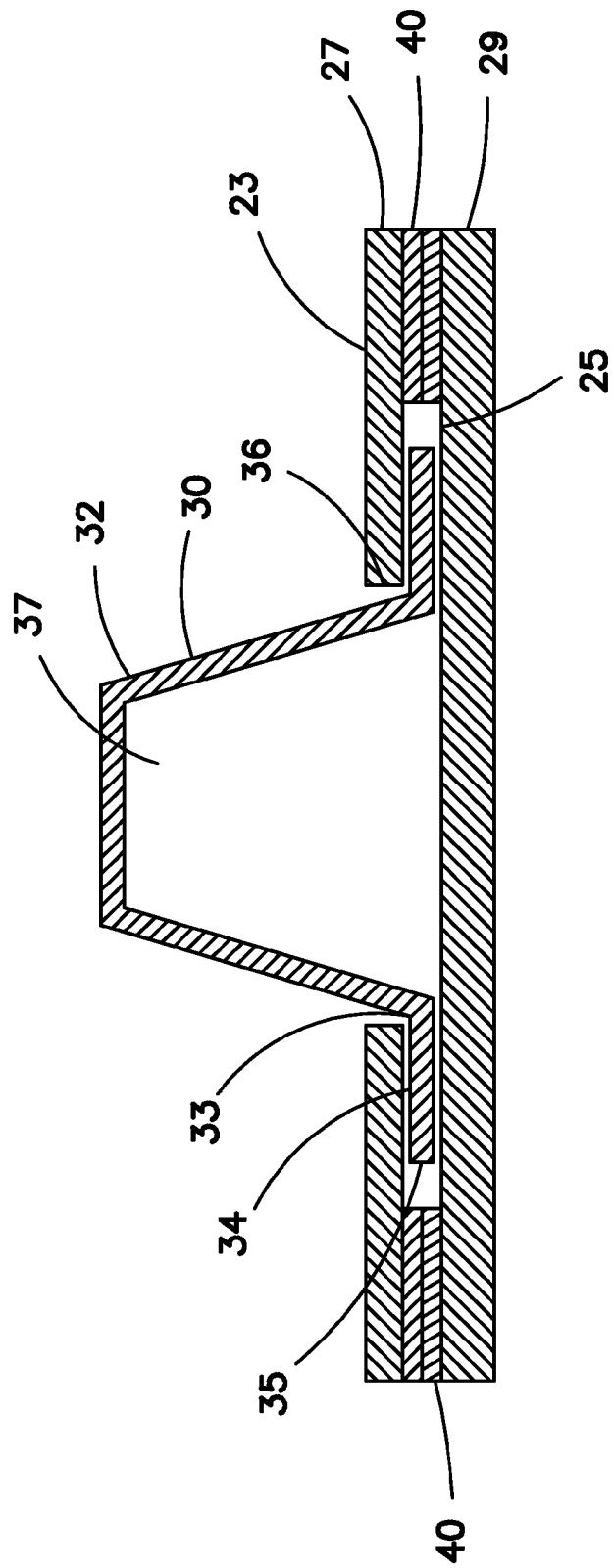
FIG. 5 shows a cross-sectional view of a housing for a product packaging container according to the present disclosure, taken across line V-V of FIG. 1.

In at least one embodiment of a product packaging container according to the present disclosure, the tray 30 includes a blister portion 32 and a flange portion 34 as shown in FIG. 5. The blister portion 32 is formed to define a product volume 37 and a blister perimeter 33 appropriately sized to accept, complement, and conform to a specific product to be packaged within the container 10. The flange portion 34 extends in a plane from the blister perimeter 33 and defines a flange perimeter 35. The flange portion 34 enables the tray 30 to be trapped between the top portion 27 and bottom portion 29 when the housing 20 is in the folded configuration while further enabling the blister portion 32 to project through the opening 36. In at least one embodiment of the present disclosure as shown in FIGS. 1 and 5, the opening 36 in housing 20 is formed to be the same as or slightly larger than the blister perimeter 33 but substantially smaller than the flange perimeter 35, further enabling secure handling and display of the product within container 10. It should be noted that the width of the flange portion 34 may vary with the size and weight of the product to be secured within the container 10. Larger and heavier products may generally require a wider flange portion 34 to adequately distribute the weight of the product to the housing 20 and to securely retain the flange portion 34 between the top portion 27 and bottom portion 29 in the folded configuration.

The tray 30 may be made of any material suitable for secure shipping, handling, and display of the product within the container 10. Exemplary materials may include clear plastic materials, such as polyethylene terephthalate, that can be molded or thermoformed into a shape generally conforming to the product to be secured within the container 10.

As mentioned above, adhesive 40 binds top portion 27 and bottom portion 29 together and seals product tray 30 within product packaging container 10. Adhesive 40 is a quick-drying, latex-based adhesive that can be pattern-coated on a substrate and, once dried, creates a surface with essentially no tack and adheres only to other surfaces coated with the same adhesive when placed under high pressure. In the embodiment shown in FIG. 3, adhesive 40 may be applied to interior surface 25 within upper adhesive region 42, lower adhesive region 43, upper product adhesive region 44, and the lower product adhesive region 45. When housing 20 is folded at weakness 21 and sufficient pressure is applied to the housing 20, the adhesive 40 in the upper adhesive region 42 bonds with the adhesive 40 in the lower adhesive region 43, and the adhesive 40 in the upper product adhesive region 44 bonds with the adhesive 40 in the lower product adhesive region 45. The secure bonding of these regions occurs only when sufficient pressure of approximately 500 psi is applied to the adhesive by a cold seal compressor or other sealing device.

Figure 6:
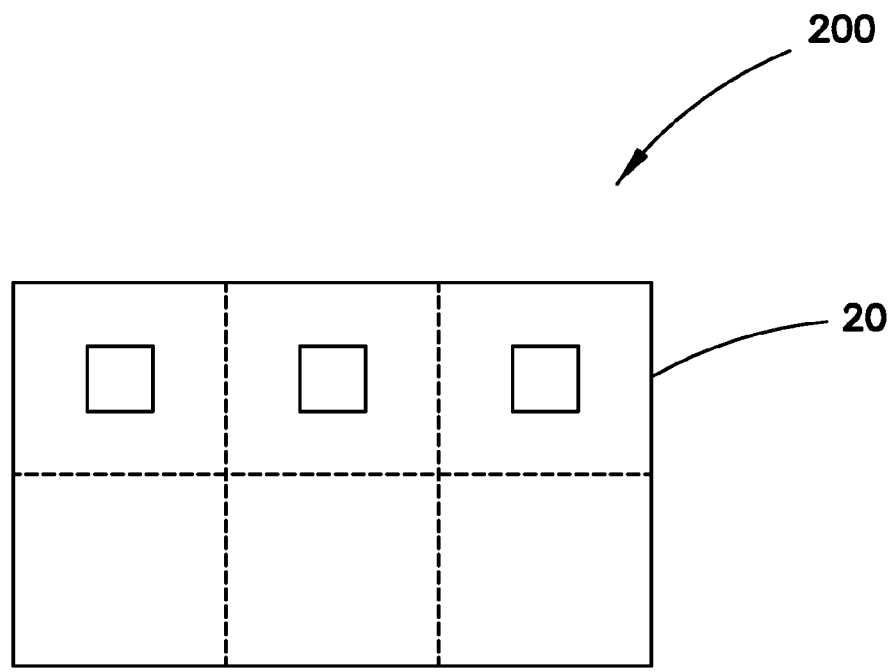
FIG. 6 shows a housing web for a product packaging container according to the present disclosure.

Because the adhesive 40 dries quickly and is only applied to the interior surface 25 of housing 20, the use of the adhesive 40 allows multiple housings to be stacked on top of one another at the end of the manufacturing process, as the exterior surface 23 of one housing will not adhere to the interior surface 25 of another housing. The ability to immediately stack multiple housings 20 after application of adhesive 40 greatly improves the throughput of the manufacturing process compared to prior art processes using conventional adhesives in which the adhesives were slow to dry and were susceptible to smearing when coming into contact with the other surfaces. Prior art manufacturing processes were also limited in the number of housings that could be stacked together, as the accumulation of weight lower in a stack of housings increased the possibility of the housings adhering to each other. Often housings are transported standing on end instead of lying flat to avoid adhering the housings together (commonly referred to as "blocking"); however, the housings are susceptible to damage when transported this way. Unlike conventional packaging using contact adhesives, housings 20 produced by the adhesive application methods of the present disclosure may be handled, stacked, stored, and transported in economically efficient quantities without sticking together because of the rapid drying process and the lack of tack achieved of the dried adhesive 40. The properties and application methods of the adhesive 40 also enable the adhesive 40 to be applied prior to cutting housing 20, as an entire sheet of housings 200, as shown in FIG. 6 could pass through the machinery without adhesive 40 smearing or leaving residue on the machinery.

As mentioned above, in at least one embodiment of a product packaging container according to the present disclosure, the adhesive 40 may be applied in specific adhesive regions on the interior surface 25 of the housing 20. Such application may be referred to as pattern-coating. As depicted in FIGS. 3 and 4, the adhesive 40 may be applied along a perimeter of the housing 20 within an upper adhesive region 42 and a lower adhesive region 43 that extend along each of the leading, trailing, first and second side edges 22, 24, 26, 28 and the line of weakness 21, whereby the upper adhesive region 42 on the top portion 27 substantially contacts the lower adhesive region 43 on the bottom portion 29 when the housing 20 is in the folded configuration. Because the adhesive will only adhere to itself under pressure, any adhesive region located on the top portion 27 of housing 20 should have a corresponding adhesive region on the bottom portion 29. As shown in FIG. 4, the perimeter adhesive region 42 may extend from the an edge 22, 24, 26, 28 toward the center of the interior surface 25 but may not extend as far as the opening 36 as to avoid contact between the adhesive 40 and the tray 30. In at least one embodiment of the present disclosure, the width of the upper and lower adhesive regions 42, 43 extend no more than 0.5 in. toward the center of the interior surface 25. In at least one embodiment of the present disclosure, the width of the upper and lower adhesive regions 42, 43 extend approximately 1.0 in. toward the center of the interior surface 25. Applying the adhesive 40 in the narrow perimeter upper adhesive region 42 and lower adhesive region 43 prevents any contact between the adhesive 40 and the tray 30, which facilitates recyclability of the container 10 by enabling easy separation of the tray 30 from the housing 20 without leaving contaminating adhesive 40 on the tray 30.

Alternatively, as shown in FIG. 3, a product packaging container 10 may include an upper product adhesive region 44 and a lower product adhesive region 45 or any number of other adhesive regions separated from the perimeter adhesive regions 42, 43 by a region without adhesive 40. Regardless, to facilitate recyclability of container 10, the upper and lower product adhesive regions 44, 45 should be located so as not to contact the tray 30.

In addition to facilitating recyclability of container 10, the total area of the interior surface 25 occupied by the perimeter adhesive region 42 may be reduced to minimize the amount of adhesive 40 included in the container 10. Minimizing the adhesive region 42 reduces the cost of the container 10 by both reducing the amount of materials used and increasing the rate of production of the housing 20. Nonetheless, a sufficient amount of adhesive 40 must be used to ensure the top and bottom portions 27, 29 of the housing 20 are sealed together with sufficient strength and durability as required for a specific container 10 as disclosed herein.

Adhesive 40 may be applied to the housing 20 by a modified flexographic printing process that uses a flexible relief die to control application of and minimize induced shear stress in the adhesive 40. The process may include using a set of cylindrical rollers, positioned adjacent to each other, which rotate relative to one another and are capable of metering, transferring and printing adhesive 40 on housing 20. Those of ordinary skill in the art having the benefit of this disclosure may recognize that other machinery may effectively apply the adhesive 40. Once the adhesive 40 has quickly dried, the adhesive regions in the top portion 27 and bottom portion 29 will only bond to each other upon the application of pressure from a cold seal compressor or other sealing device. Since the adhesive 40 is only applied to a limited number of adhesive regions, only those regions need to be sealed rather than the entire surface, as in prior art packaging. This highly controlled application and pattern-coating process not only reduces the amount of adhesive 40 needed for the final container 10, but also enables the adhesive 40 to be applied so that it is not in direct proximity to the product being packaged or the product tray 30.

Traditionally, high speed printing press processes, for example, flexographic printing, are anticipated to induce shear stresses in a material used for printing, generally inks. Because inks are not generally adversely affected by the levels of shear stress induced by the these processes, operators have not had a need to modify their high speed printing press processes to reduce the shear stresses induced. However, some adhesive materials, such as the cold seal adhesive, are sensitive to shear as described above. Consequently, conventional high speed printing processes are not capable of applying the cold seal adhesive without inducing the shear stress responsible for agglomeration of the adhesive. As a result, various modifications must be made to a conventional flexographic printing press to enable continuous, high speed application of the cold seal adhesive, as disclosed herein. In total, the cold seal adhesive enables production rates not possible using conventional packaging adhesives. For example, the cold seal adhesive may be applied at a production rate of about 1,750 square feet per minute ($ft^2$/min), compared to roughly 75 $ft^2$/min for conventional application processes and adhesives on corrugated board. Further, the cold seal adhesive may be applied prior to a die cutting operation, unlike conventional adhesives, thereby allowing the die cutting operation to be included within the application process and providing additional production efficiencies.

Figure 7:
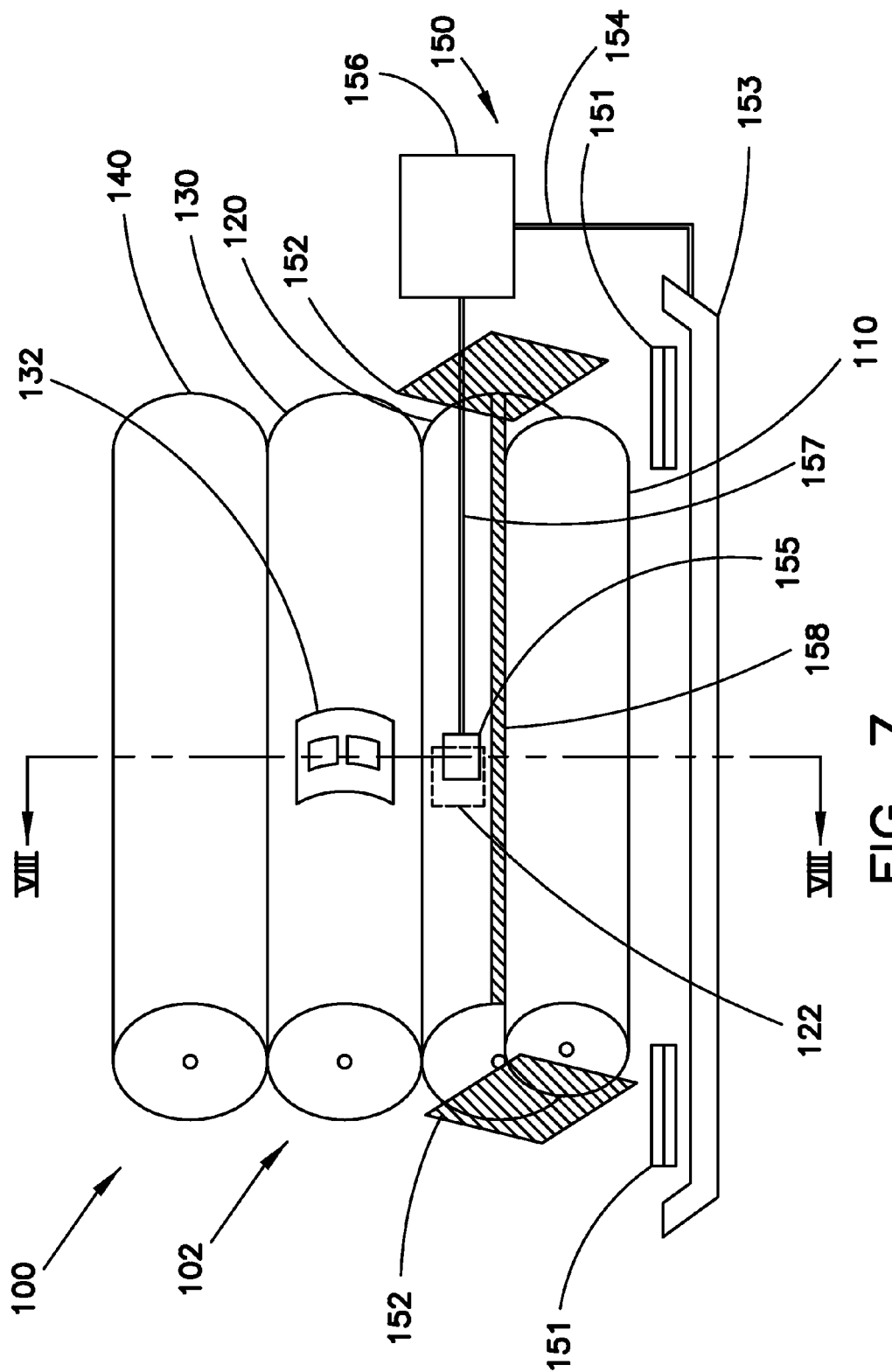
FIG. 7 shows a perspective view of an adhesive application apparatus for an adhesive application method according to the present disclosure.

FIG. 7 shows an apparatus for applying the adhesive 40 for product packaging according to the present disclosure. As shown in FIG. 7, adhesive application apparatus 100 includes a set of cylindrical rollers 102, which are positioned adjacent one another, rotate relative to one another around their respective axes, and are thereby capable of metering, transferring, and printing the adhesive 40 on a substrate, such as housing 20. The adhesive application apparatus 100 resembles a conventional in-line flexographic printing machine commonly used to print ink on packaging materials, such as housing 20. However, due to the shear sensitivity of adhesive 40, a conventional in-line flexographic printing machine is not capable of continuously applying adhesive 40 effectively or efficiently. As a latex-based adhesive, the viscosity of the adhesive 40 increases dramatically under high-shear conditions due to shear thickening or agglomeration. Essentially, the adhesive 40 is activated by shear stress and will begin to crosslink, congeal, and agglomerate due to shear stress induced in the adhesive 40 by the application process. Concurrently, conventional high speed application processes, such as flexographic printing, are disposed to inducing significant shear stress in an adhesive. Consequently, the adhesive application apparatus 100 differs in many respects from a conventional in-line flexographic printing machine, as described below, and therefore enables the adhesive application apparatus 100 to apply the adhesive 40 discretely within the top and bottom adhesive regions 42, 43.

As shown in FIG. 7, the set of cylindrical rollers 102 may include a metering roller 110 disposed adjacent a transfer roller 120. The set of cylindrical rollers 102 may further include a die roller 130 adjacent the transfer roller 120, which is capable of applying a controlled amount of adhesive 40 onto a printing die 132 mounted on the die roller 130. An impression roller 140 may be positioned adjacent the die roller 130 and separated at a distance that permits the housing 20 to pass therebetween, thus enabling the printing die 132 to contact the interior surface 25 and imprint the adhesive 40 within the perimeter adhesive regions 42, 43 while the impression roller 140 contacts and supports the exterior surface 23.

Figure 8:
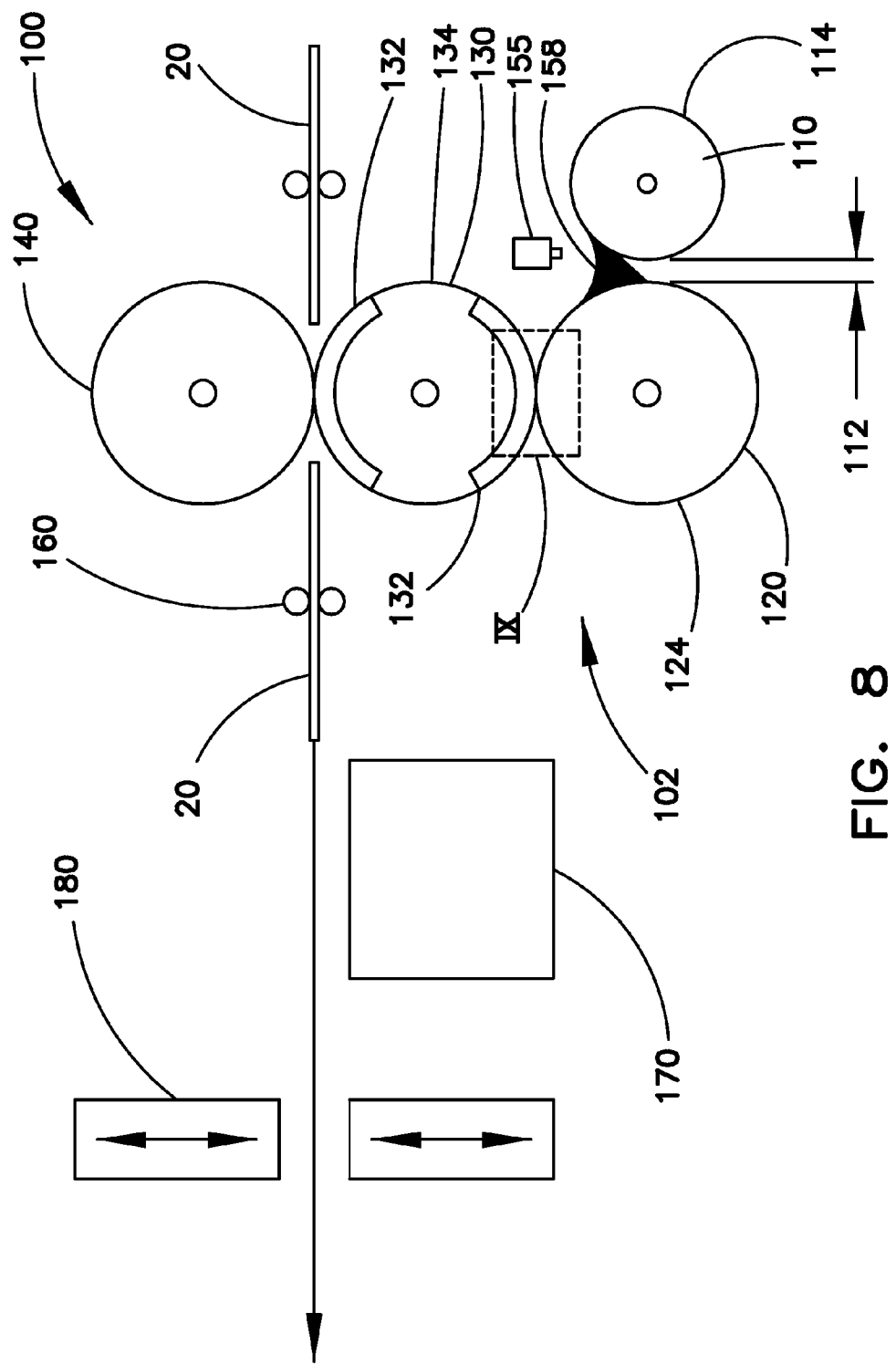
FIG. 8 shows a side view of an adhesive application apparatus for an adhesive application method according to the present disclosure.

As shown in FIG. 8, the metering roller 110 may be positioned adjacent to the transfer roller 120 such that a nip gap 112 separates the outer surfaces of the metering roller 110 and the transfer roller 120. The purpose of the metering roller 110 is to control the amount of adhesive 40 carried by the transfer roller 120 to the printing die 132 and, to that extent, may be analogous to that of a doctor blade used in a conventional flexographic printing process. Accordingly, the adhesive 40 is dispensed into the nip gap 112 from a dispense nozzle 155, as shown in FIG. 7. The nip gap 112 is set such that it enables an amount of adhesive 40 to pool or puddle between the metering 110 and the transfer 120 rollers. The pool of adhesive 40 formed between the metering 110 and the transfer 120 rollers is commonly referred to as a nip 158. However, due to the shear sensitivity of the adhesive 40, the nip gap 112 must be set to ensure that shear forces do not cause the adhesive to polymerize and congeal into a film on the metering 110 and the transfer 120 rollers.

The purpose of the transfer roller 120, which may be commonly referred to as an anilox roller, is to apply the proper amount of adhesive 40 on the printing die 132. Accordingly, the transfer roller 120 includes a surface 124, which may be engraved with a plurality of small cells 122 that accept the adhesive 40 from the metering roller 110. Alternatively, the transfer roller 120 need not include the cells 122 and may instead transfer the adhesive 40 to the printing die 132 directly from the surface 124. The cells 122 may be engraved mechanically or by laser to form a plurality of volumes into the surface 124 of the transfer roller 120. The cells 122 may be have a variety of shapes known in the art, including trihelical, pyramid, quadrangular, hexagonal, or hexagonal channel screen. Several characteristics of the transfer roller 120 determine the amount of adhesive 40 that will be transferred to the printing die 132, such as the angle, volume, and line screen density of the cells 122. In an exemplary embodiment of the present disclosure, the transfer roller 120 has a cell line screen density of 40-250 lines per linear inch (LPI) and typically 60 LPI.

As is known in the printing art, cell volume and line screen density are closely correlated. Typically, lower cell volumes transfer less adhesive. Conversely, low line screen density will allow for a heavy layer of adhesive 40 to be transferred, whereas high line screen density will permit finer detail in adhesive application. The internal volume of cells engraved in an anilox roller is commonly specified in units of billion cubic microns per square inch (BCM). Larger BCM values equate to greater internal cell volumes and result in larger amounts of adhesive 40 being transferred from the transfer roller 120 to the print die 132 mounted to the die roller 130. In an exemplary embodiment of the present disclosure, the transfer roller 120 has cell volumes 123 of about 40 BCM at a line screen density between 40-250 LPI and typically 60 LPI. However, one skilled in the art having the benefit of this disclosure may recognize that other combinations of cell volume and line screen density may perform equally well in the adhesive application apparatus 100.

Accordingly, one skilled in the art having the benefit of this disclosure may recognize that other combinations of cell volume and line screen density may perform equally well in the adhesive application apparatus 100.

The metering roller 110 may be constructed of a shaft or core of metal or other hard material covered with an elastomeric covering. The elastomeric covering may be made of neoprene, Buna N (a copolymer of butadiene and acrylonitrile), ethylene propylene diene monomer (EPDM), polyurethane, natural rubber, or other suitable material. The transfer roller 120 may be constructed of a shaft or core of metal or other hard material covered with a hard, engravable material, such as ceramic, stainless steel, or chrome-plated nickel/copper alloy.

Figure 9:
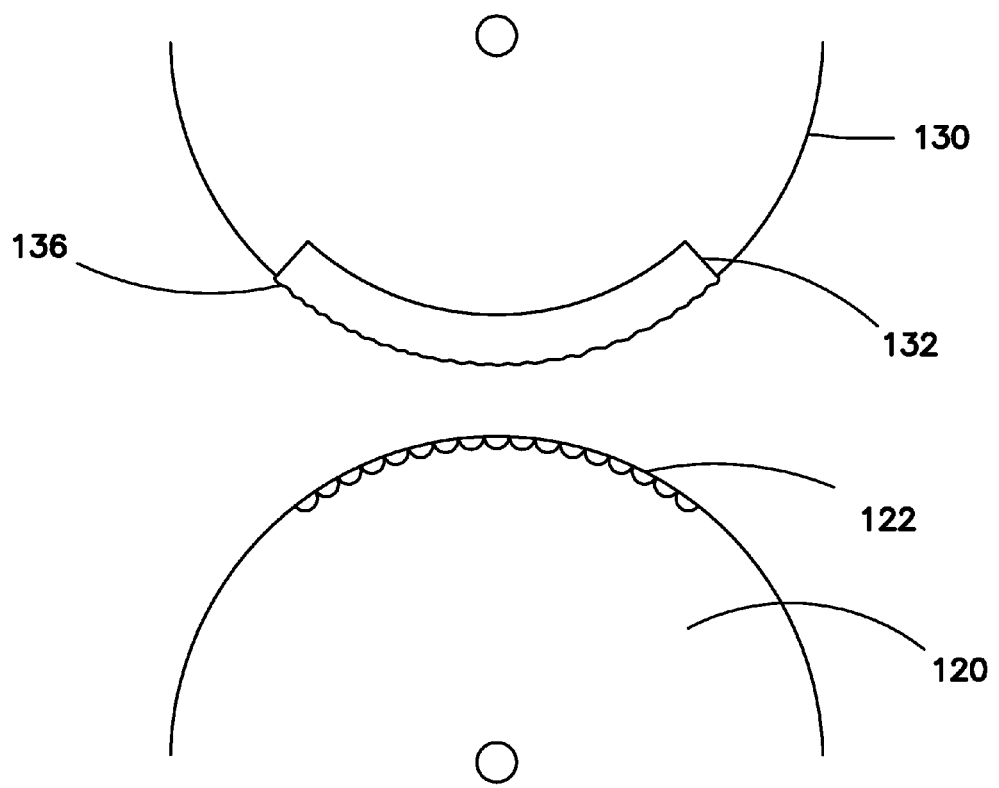
FIG. 9 shows a detail view taken from FIG. 8 of an adhesive application apparatus for an adhesive application method according to the present disclosure.

As shown in FIG. 7, the die roller 130 is positioned adjacent to and configured to rotate in the opposite direction from the transfer roller 120. A printing die 132 is mounted on the die roller 130 such that it is proud of the surface 124 of the die roller 130 and aligned to contact the transfer roller 120. The rotation of the transfer roller 120 and the die roller 130 may be closely timed to enable the printing die 132 to contact the cells 122 on the transfer roller 120. For clarity FIG. 9 depicts the transfer roller 120 separated at a distance from the die roller 130; however, in at least one embodiment the transfer roller 120 may contact the die roller 130. As depicted in FIG. 9, as the surface of the printing die 132 contacts the cells 122, the adhesive 40 temporarily adheres to the printing die 132 due to the surface energy of the printing die 132, thereby transferring a controlled amount of the adhesive 40 from the cells 122 to the printing die 132. The printing die 132 is essentially a relief plate made of a flexible and resilient material capable of transferring the adhesive 40 from the cells 122 to the housing 20, including natural rubber, synthetic elastomeric polymer, and photopolymer that crosslinks upon exposure to ultraviolet energy. As depicted in FIG. 9, the contact surface 136 of the printing die 132 may be course and porous to facilitate acceptance of the adhesive 40 from the cells 122 of the transfer roll 120 and subsequent deposition on the housing 20. Alternatively, the transfer roller 120 need not include the cells 122 and may instead transfer the adhesive 40 to the printing die 132 directly from the surface 124.

As shown in FIG. 7, the impression roller 140 is positioned adjacent to and configured to rotate in the opposite direction from the die roller 130. In operation, as the die roller 130 rotates, a housing 20 is fed between the impression roller 140 and the die roller 130 such that the printing die 132 contacts the housing 20 and applies the adhesive 40 to the upper and lower adhesive regions 42, 43 of the housing 20. The purpose of the impression roller 140 is to support and apply pressure to the exterior surface 23 of the housing 20 as the printing die 132 contacts the interior surface 25. The impression roller 140 also assists to feed the housing 20 across the printing die 132. Accordingly, the impression roller 140 may be made of any suitable material that is capable to supporting the housing 20 with sufficient pressure to enable adequate transfer of the adhesive 40 from the printing die 132 to the housing 20 and to feed the housing 20 across the printing die 132.

The die roller 130 may have a plurality of printing dies 132 mounted thereon to enable the application of adhesive 40 onto multiple housings 20 with each rotation of the die roller 130. FIG. 6 shows an example of a housing web 200 for use with the adhesive application apparatus 100. The housing web 200 may comprise three adjacent, uncut housings 20, but those of ordinary skill in the art will understand that housing webs used with the present invention can comprise any number of housings. By way of example, where the housing web 200 is processed through the adhesive application apparatus 100 of the present disclosure, the die roller 130 may be configured with a grouping of six printing dies 132 corresponding to the upper and lower adhesive regions 42, 43 of each individual housing 20 within the housing web 200.

In addition to the die roller 130 and the impression roller 140, the adhesive application apparatus 100 includes a plurality of feed rollers 160 that further assist to convey the housing 20 or housing web 200 through the apparatus.

As shown in FIG. 8, the adhesive 40 is dispensed into the nip 158 by an adhesive dispense system 150, which controls the flow rate of the adhesive 40 and avoids inducing shear stress in adhesive 40 that may cause the adhesive 40 to congeal and clog the application apparatus 100. The adhesive dispense system 150 may also include a pump 156 fluidly connected to a supply line 157 that is further fluidly connected to a dispense nozzle 155. The pump 156 may deliver adhesive 40 via the supply line 157 to the dispense nozzle 155, which dispenses adhesive 40 into the nip 158. As noted herein, the adhesive 40 is sensitive to shear and must be delivered to the nip 158 without creating significant shear stress in the adhesive 40. Consequently, the pump 156 may be a non-shearing pump such as a diaphragm pump or a peristaltic pump.

Figure 10:
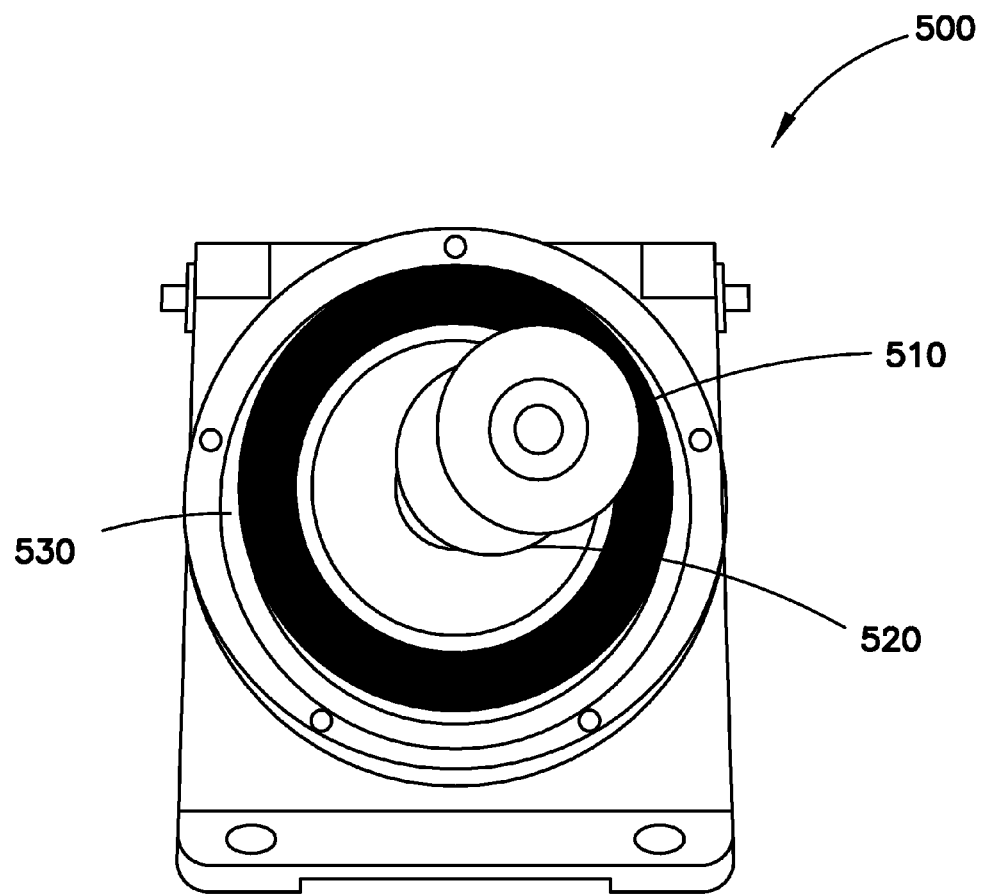
FIG. 10 shows a pump for an adhesive application apparatus for an adhesive application method according to the present disclosure.
Figure 11:
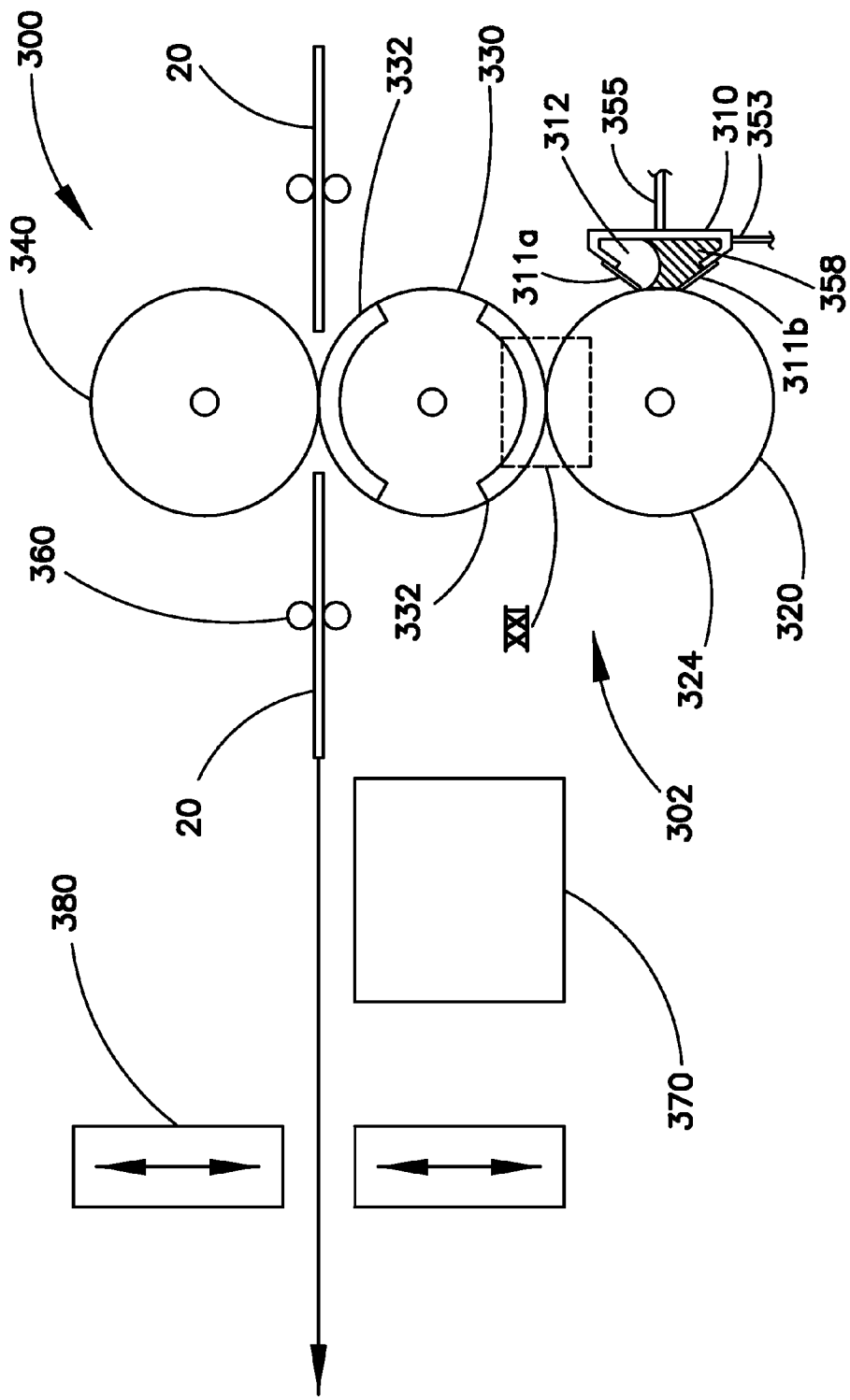
FIG. 11 shows a side view of an alternative adhesive application apparatus for an adhesive application method according to the present disclosure.
Figure 12:
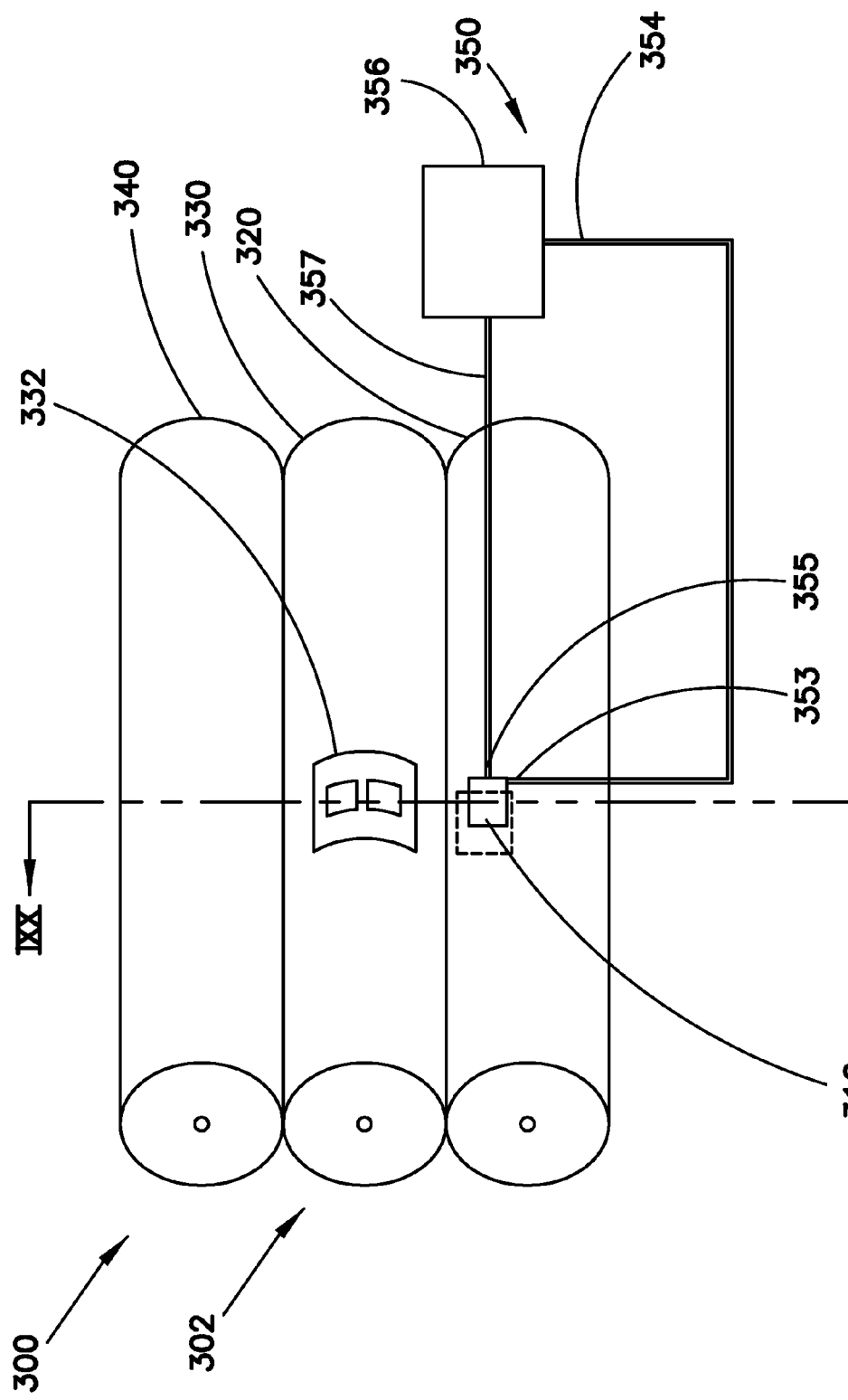
FIG. 12 shows a perspective view of an alternative adhesive application apparatus for an adhesive application method according to the present disclosure.
Figure 13:
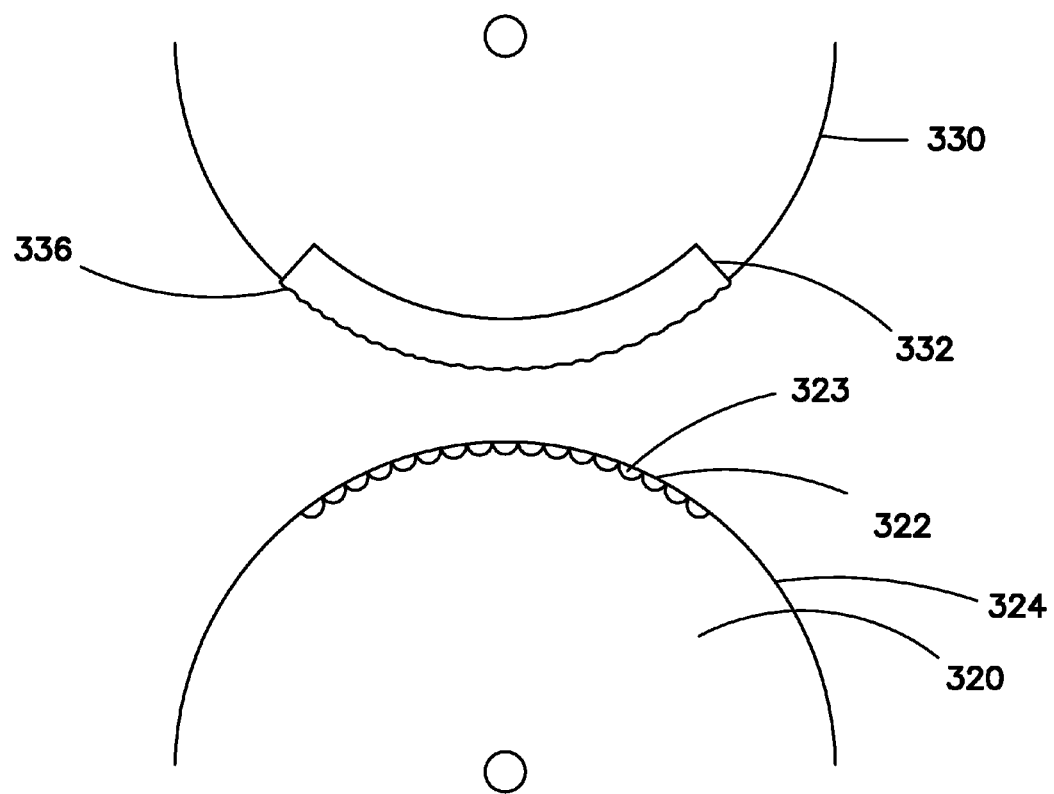
FIG. 13 shows a detail view taken from FIG. 11 of an adhesive application apparatus for an adhesive application method according to the present disclosure.
Figure 14:
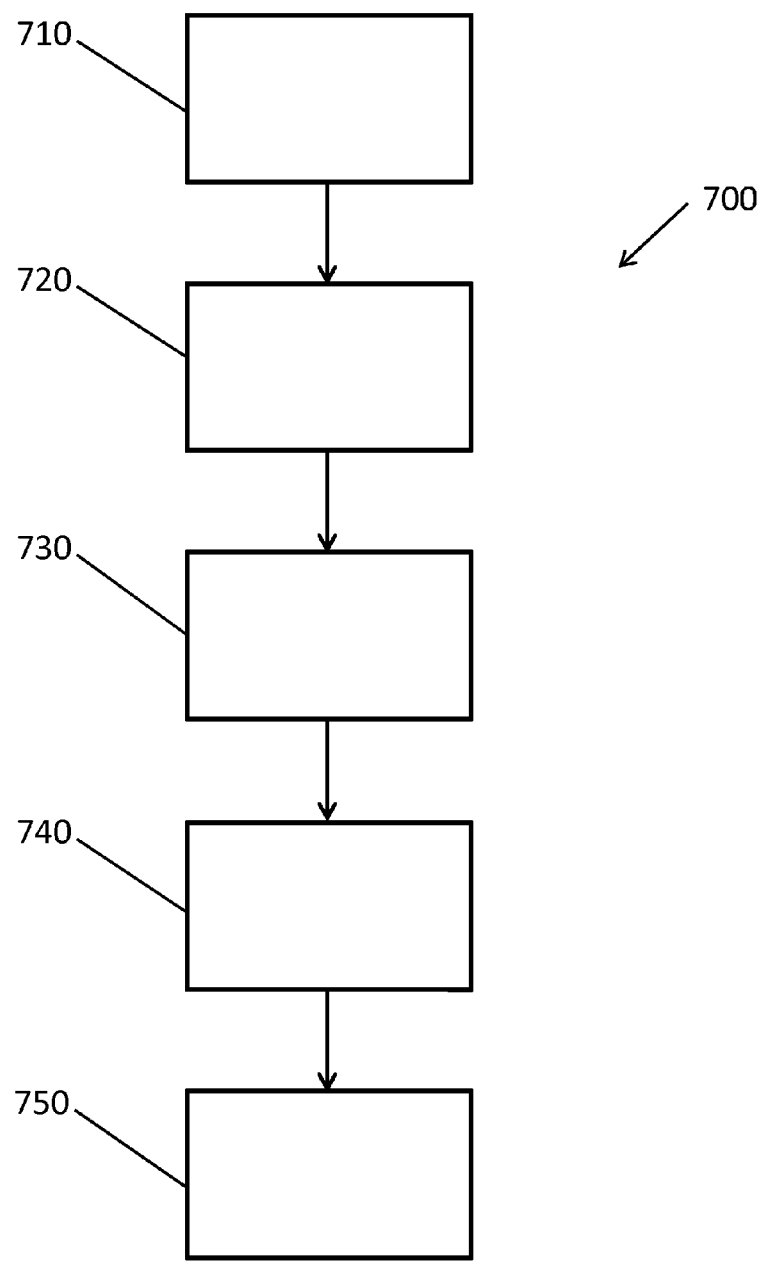
FIG. 14 shows an adhesive application method according to the present disclosure.
Figure 15:
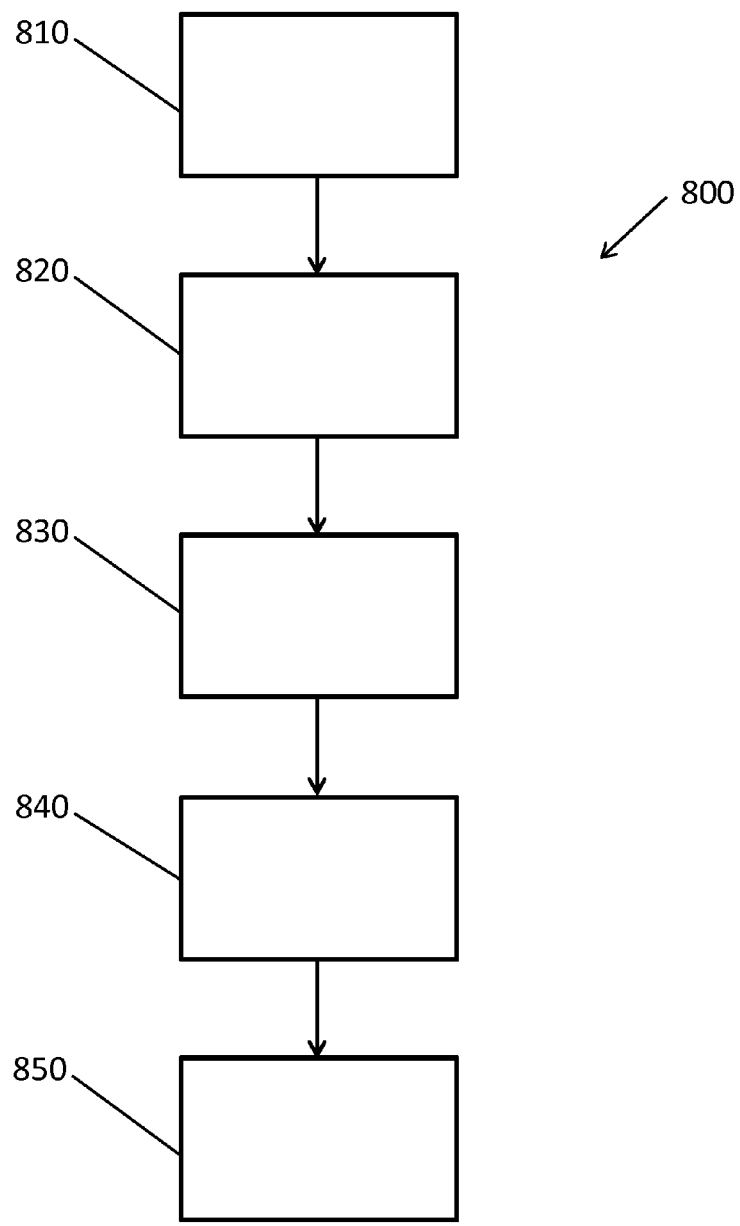
FIG. 15 shows an alternative adhesive application method according to the present disclosure.
Figure 16:
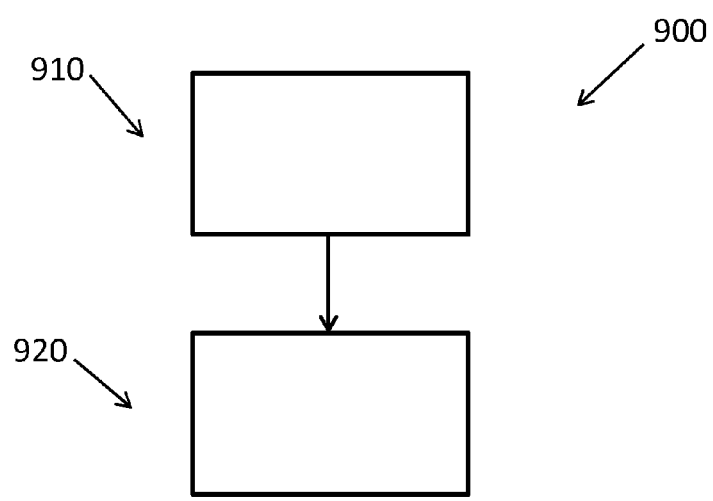
FIG. 16 shows a cold seal compressor method according to the present disclosure.

As shown in FIG. 10, according to one embodiment of the present disclosure, the pump 156 may be a 360-degree peristaltic pump 500 that includes a single pump roller 510 rotatably attached to an eccentric shaft 520. The pump roller 510 compresses a low friction hose 530 through 360 degrees of rotation. The benefits of the peristaltic pump 500 include more adhesive flow per revolution with only one compression and expansion per cycle, which reduces shear stress in the adhesive 40. To further reduce shear stress, the pump roller 510 may be configured to minimize the occlusion of the hose 530, which also contributes to in longer pump life. In at least one embodiment of the pump 156, the occlusion may be between 90-98%. Moreover, the peristaltic pump 500 is capable of delivering long, steady streams of adhesive 40, which enables the pump 500 run relatively slowly and contributes to in longer pump life while also minimizing shear stress in the adhesive 40. Alternatively, the pump 156 may be a low shearing diaphragm or dual diaphragm pump well-known in the art.

Shear stress is also a concern at each axial end of the metering roller 110 and transfer roller 120. To prevent an excessive amount of adhesive 40 from flowing out of the nip 158 and off the ends of the rollers 110, 120, a dam 152 may be placed at each end of the rollers 110, 120, as shown in FIG. 8. However, shear stress may develop in the adhesive 40 between the dam 152 and the ends of the rotating metering and transfer rollers 110, 120. To prevent the aforementioned undesirable shearing stress in the adhesive 40, the dams 152 may be allowed to float relative to the ends of the metering 110 and transfer 120 rollers. Nonetheless, some shear stress may be inevitable. Consequently, one or more screen filters 151 may be placed adjacent each dam 152, whereby any adhesive 40 that has begun to congeal due to shear stress can be removed from the adhesive flow as the adhesive 40 runs off the axial ends of the metering 110 and transfer 120 rollers and passed the dams 152. Further, at least one trough 153 may be located adjacent the screen filters 151 to collect excess run-off adhesive 40 that passes through the screen filters 151. The trough 153 may be fluidly connected to the pump 156 by a recirculation line 154 to reclaim and reuse excess run-off of adhesive 40 from the nip 158, thus minimizing waste and further improving the efficiency of the adhesive application apparatus 100.

Referring to FIG. 8, after passing between die roller 130 and impression roller 140, the housing 20 may be conveyed passed one or more dryers 170 by the plurality of feed rollers 160. The dryers 170 act to evaporate the remaining liquid from the adhesive 40 applied to the interior surface 25 of housing 20, such that the surface tension of the dried adhesive 40 has essentially no tack. Accordingly, the dryers 170 may be any suitable energy source capable to drying the adhesive 40 within the required production rate of the adhesive application process, including infrared or macro-wave lamps, convection ovens, or the like. Because the adhesive application apparatus 100 applies a very controlled and thin layer of adhesive 40 isolated to the segregated adhesive regions 42, 43, the adhesive 40 dries to having essentially no tack very quickly, as much as 10 times faster than conventional flow or roller coat processes.

The drying of adhesive 40 may be the rate limiting step within the adhesive application apparatus 100, meaning that faster drying methods increase the overall potential rate of production of the adhesive application apparatus 100. For example, where infrared dryers are used and given a housing 20 approximately 19 in. long, the adhesive application apparatus 100 may produce 30,000-40,000 coated housings per hour continuously. Where radio or microwave dryers are used, the production rate may be higher. In addition, these throughput rates may be further increased by processing a plurality of housings 20 in the same pass using the housing web 200. Therefore, where the housing web 200 includes three adjacent housings 20, as shown in FIG. 6, the production rates may be as much as three times greater than disclosed.

In at least one embodiment of an adhesive application apparatus 100 of the present disclosure, as shown in FIG. 8, the plurality of feed rollers 160 may convey the housing 20 through a die punch 180 capable of forming one or more openings 36 through the housing 20. It should be noted that the housing 20 may be fed through die punch 180 before or after application of adhesive 40, unlike conventional packaging adhesive processes that must perform the die punch process prior to application of the adhesive.

FIG. 19 shows an alternative apparatus for applying the adhesive for product packaging according to the present disclosure. As shown in FIG. 19, an adhesive application apparatus 300 is similar to the adhesive application apparatus 100; however, the apparatus 300 embodies a number of significant differences. For instance, instead of a metering roll, such as the metering roll 110 of the apparatus 100, the apparatus 300 may include a chambered doctor blade 310. Accordingly, the apparatus 300 may include a set of cylindrical rollers 302, including the chambered doctor blade 310 disposed adjacent a transfer roller 320 with a die roller 330 adjacent the transfer roller 320. The set of cylindrical rollers 302 may further include an impression roller 340 positioned adjacent the die roller 330 and separated at a distance that permits the housing 20 to pass therebetween, thus enabling a printing die 332 mounted to the die roller 330 to contact the interior surface 25 and imprint the adhesive 40 within the perimeter adhesive regions 42, 43 while the impression roller 340 contacts and supports the exterior surface 23.

The chambered doctor blade assembly 310 enables precise metering and application of the adhesive 40 onto the transfer roll 320. The chambered doctor blade assembly 310 may include an upper blade 311a and a lower blade 311b mounted to a chamber 314 such that the tips of the upper blade 311a and the lower blade 311b contact the transfer roller 320 and define a closed nip volume 312. The chamber 314 may include an inlet 355 for delivery of the adhesive 40 into the nip volume 312 and an outlet 353 for draining excess adhesive 40. In operation, the upper blade 311a and lower blade 311b may be positioned such that a pool of adhesive 40, commonly referred to as a nip 358, forms within the nip volume 312 and contacts the transfer 320 roller. The nip 358 is formed by adhesive 40 supplied via the inlet 355. The upper blade 311a and lower blade 311b are further positioned such that a sufficient, but not excessive, amount of adhesive 40 is transferred to the transfer roll 320 in a controlled manner. Excess adhesive 40 may be drained away from the nip volume 312 via the outlet 353. The upper blade 311a and lower blade 311b may be formed from conventional materials, such as fiberglass, acetal, metal, polyethylene, ultra-high-molecular-weight polyethylene ("UHMW"), or any suitable material. The shape of the tips of the upper blade 311a and lower blade 311b may be straight, beveled, beveled with a step, or other suitable shape. A UHMW blade with a beveled step tip, commonly referred to as a DACC blade, enables a thicker coverage of adhesive 40 transferred to the housing 20. In at least one embodiment according to the present disclosure, the blades 311a and 311b may be DACC blades.

Because the chambered doctor blade assembly 310 provides a closed system for dispensing and metering the adhesive 40 upon the transfer roller 320, some of the dispense and recirculation components of adhesive application apparatus 100 that enable the reuse of excess adhesive 40 may not be required in the adhesive application apparatus 300. For instance, the adhesive application apparatus 300 may not include dams, filter screens, or a trough. However, as shown in FIG. 20, the adhesive application apparatus 300 may include a supply line 357 fluidly connected to a pump 356 at one end and the inlet 355 at the opposite end. The adhesive application apparatus 300 may further include recirculation line 354 fluidly connected to the pump 356 at one end and the outlet 353 at the opposite end. The pump 356 may be substantially similar to the pump 156. Additionally, as a closed system the chambered doctor blade assembly 310 minimizes induced shear in the adhesive 40 and, thereby, potential waste from agglomeration.

The adhesive application apparatus 300 may further differ from the adhesive application apparatus 100 with respect to transfer roller 320. The use of the chambered doctor blade assembly 310 is further enabled by the transfer roller 320, which may be commonly referred to as an anilox roller. For clarity FIG. 21 depicts the transfer roller 320 separated at a distance from the die roller 330; however, in at least one embodiment the transfer roller 320 may contact the die roller 330. As shown in FIG. 21, the transfer roller 320 may include a surface 324 having a plurality of small cells 322 engraved therein. The cells 322 may be similar in structure to the cells 122 of the transfer roller 120 except that the internal volume 323 of each of the cells 322 is larger than the volumes of the cells 122. In an exemplary embodiment of the present disclosure, the transfer roller 320 has cell volumes 323 of 30-50 BCM, and typically 40 BCM, at a line screen density of 50-100 LPI and typically 60 LPI. However, one skilled in the art having the benefit of this disclosure may recognize that other combinations of cell volume and line screen density may perform equally well in the adhesive application apparatus 300. Alternatively, the transfer roller 320 need not include the cells 322 and may instead transfer the adhesive 40 to the printing die 332 directly from the surface 324.

In at least one embodiment of the present disclosure, the adhesive 40 may be applied to the interior surface 25 of the housing 20 using the adhesive application apparatus 100 by an adhesive application method 700. As shown in FIG. 17, the adhesive application method 700 includes a step 710 of delivering the adhesive 40 to the nip 158 between the rotating metering roller 110 and the adjacent rotating transfer roller 120, the transfer roller 120 having a pattern of cells 122 engraved into the transfer roller surface 124, the cells 122 being capable of accepting a quantity of the adhesive 40 from the nip 158. The adhesive application method 700 further includes the step 720 of rotating the transfer roller 120 whereby the cells 122 contact the printing die 132 mounted to the rotating die roller 130 positioned adjacent the transfer roller 120, whereby further the adhesive 40 is transferred from the cells 122 to the printing die 132. Moreover, the adhesive application method 700 includes the step 730 of feeding the housing 20 between the die roller 130 and the adjacent impression roller 140, wherein housing 20 includes interior surface 25, opposing exterior surface 23, top portion 27, bottom portion 29, top adhesive region 42, bottom adhesive region 43, and is capable of a folded configuration whereby the interior surfaces 25 of top portion 27 and bottom portion 29 at least partially contact each other, and wherein the die roller 130 and the impression roller 140 are capable of supporting the exterior surface 23 of housing 20. Furthermore, the adhesive application method 700 includes the step 740 of rotating the die roller 130 whereby the printing die 132 contacts top adhesive region 42 and bottom adhesive region 43 and thereby transfers the adhesive 40 from the printing die 132 to top adhesive region 42 and bottom adhesive region 43 as housing 20 advances between the die roller 130 and the impression roller 140. The adhesive application method 700 further includes the step 750 of rapidly drying the adhesive 40 on housing 20, such that the dried adhesive 40 lacks tackiness and which is only cohesive to itself when compressed with a pressure of approximately 500 psi or less. Alternatively, the transfer roller 120 need not include the cells 122 and may instead transfer the adhesive 40 to the printing die 132 directly from the surface 124.

In an alternative embodiment of the present disclosure, the adhesive 40 may be applied to the interior surface 25 of the housing 20 using the adhesive application apparatus 300 by an adhesive application method 800. As shown in FIG. 22, the adhesive application method 800 includes a step 810 of delivering the adhesive 40 to the nip volume 358 within the chambered doctor blade assembly 310 and the adjacent rotating transfer roller 320, the transfer roller 320 having a pattern of cells 322 engraved into the transfer roller surface 324, the cells 322 being capable of accepting a quantity of the adhesive 40 from the nip volume 358. The adhesive application method 800 further includes the step 820 of rotating the transfer roller 320 whereby the cells 322 contact the printing die 332 mounted to the rotating die roller 330 positioned adjacent the transfer roller 320, whereby further the adhesive 40 is transferred from the cells 322 to the printing die 332. Moreover, the adhesive application method 800 includes the step 830 of feeding the housing 20 between the die roller 330 and the adjacent impression roller 340, wherein housing 20 includes interior surface 25, opposing exterior surface 23, top portion 27, bottom portion 29, top adhesive region 42, bottom adhesive region 43, and is capable of a folded configuration whereby the interior surfaces 25 of top portion 27 and bottom portion 29 at least partially contact each other, and wherein the die roller 330 and the impression roller 340 are capable of supporting the exterior surface 23 of housing 20. Furthermore, the adhesive application method 800 includes the step 840 of rotating the die roller 330 whereby the printing die 332 contacts top adhesive region 42 and bottom adhesive region 43 and thereby transfers the adhesive 40 from the printing die 332 to top adhesive region 42 and bottom adhesive region 43 as housing 20 advances between the die roller 130 and the impression roller 340. The adhesive application method 800 further includes the step 850 of rapidly drying the adhesive 40 on housing 20, such that the dried adhesive 40 lacks tackiness and which is only cohesive to itself when compressed with a pressure of approximately 500 psi or less. Alternatively, the transfer roller 320 need not include the cells 322 and may instead transfer the adhesive 40 to the printing die 332 directly from the surface 324.

Once the adhesive 40 has been applied and dried on the housing 20, the housing 20 may be combined with the tray 30 and the product to be packaged to form the container 10, as shown in FIG. 1. Specifically, a tray 30 may be place within the opening 36 in housing 20. Subsequently, the housing 20 may be folded into the folded configuration and sealed. Because of the unique formulation of the adhesive 40, the process for sealing the top portion 27 to the bottom portion 29 of the housing 20 requires that pressure be applied to the top and bottom portions 27, 29 to initiate an adequate bond within the adhesive 40. In at least one embodiment of the present disclosure, to produce a satisfactory cohesive bond between two surfaces coated with the cold seal adhesive 40, a sealing pressure within the range of 50-1000 psi, and typically within the range of 250-500 psi, must be applied to the surfaces to be sealed. A satisfactory cohesive bond between two fibrous substrate surfaces coated with the cold seal adhesive 40 may be quantified using a 2 in. wide bonded sections subjected to a 180°-peel test at a rate of 20 inches per minute. Under such conditions, a satisfactory bond may require 10-15 pounds-force (lbf) to separate the two substrates and result in greater than 50% substrate failure (known as "fiber tear"). The cold seal adhesive 40 tested under such conditions typically requires 10-12 lbf and typically yields 100% fiber tear.

In at least one embodiment of the present disclosure, the housing 20 produced by either the adhesive application method 700 or the adhesive application method 800 may be sealed in the folded configuration by a cold seal compressor method 900 to meet the specific sealing requirements of the adhesive 40. As shown in FIG. 18, the cold seal compressor method 900 includes the step 910 of folding a housing 20 having an adhesive 40 applied thereon into the folded configuration, where the folded configuration includes at least partial contact between the interior surfaces 25 of the top portion 27 and bottom portion 29 at least partially coated with the adhesive 40. The cold seal compressor method 900 further includes the step 920 of applying a sealing pressure within the range of 50-1000 psi, and typically within the range of 250-500 psi, to the exterior surface 23 of the housing 20 opposite the top adhesive region 42 and bottom adhesive region 43 when the housing 20 is in the folded configuration.

The seal pressure to be applied in the cold seal compressor method 900 may be provided by any suitable apparatus. In at least one embodiment of the present disclosure, the seal pressure may be applied by vertically reciprocating platen that contacts the housing 20 opposite the adhesive regions 42, 43, 44, 45 only and not in the regions not coated with adhesive 40. Alternatively, the seal pressure may be applied by sets of rollers that pinch the housing 20 therebetween. Such rollers may be mounted to an adjustable platen that enables controlled adjustment of the sealing pressure.

While various embodiments of cold seal adhesive, product packing container, and adhesive application methods for making the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure and are intended to encompass any later appended claims. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A cold seal adhesive material, the adhesive comprising:
    latex emulsion comprising between 15 to 65 percent of the adhesive by weight; and
    ammoniated water,
    wherein the adhesive viscosity is between 10 and 450 centipoise at 25 degrees Celsius, the density is between 8.0 and 9.0 pounds per gallon at 25 degrees Celsius, and the basicity is between 9.5 and 12 pH,
    wherein the adhesive is adapted to be applied as a film on a substrate by a modified flexographic printing press process at a rate of at least 1,750 square feet per minute of the substrate without agglomeration of the adhesive, wherein the film has a film weight between 0.01 and 0.04 grams per square inch of the substrate, and
    wherein further, when applied and dried on the substrate, the adhesive must be compressed with a sealing pressure between 50 and 1,000 pounds per square inch to produce a cohesive bond between two or more adhesive regions.

2. The cold seal adhesive of claim 1, wherein the substrate is a housing, the housing comprising at least two adhesive regions.

3. The cold seal adhesive of claim 1, wherein latex comprises between 45-58 percent of the adhesive by weight, the adhesive viscosity is 75 centipoise at 25 degrees Celsius, the adhesive density is between 8.3 and 8.7 pounds per gallon at degrees Celsius, and the adhesive basicity is between 10 and 11 pH.

4. The cold seal adhesive of claim 1, wherein the modified flexographic printing press process comprises an transfer roller having a transfer surface with a plurality of cells formed in the transfer surface, each of the plurality of cells having a volume of 1-100 billion cubic microns per square inch at a line screen density between 40-500 lines per linear inch.

5. The cold seal adhesive of claim 1, wherein the modified flexographic printing press process comprises an transfer roller having a transfer surface with a plurality of cells formed in the transfer surface, each of the plurality of cells having a volume of 30-50 billion cubic microns per square inch at a line screen density between 50-250 lines per linear inch.

6. The cold seal adhesive of claim 4, wherein each the plurality of cells has a volume of approximately 40 billion cubic microns per square inch at a line screen density of approximately 60 lines per linear inch.

7. The cold seal adhesive of claim 4, wherein the transfer roller is an anilox roller.

8. The cold seal adhesive of claim 1, wherein the sealing pressure is approximately 500 pounds per square inch.

9. The cold seal adhesive of claim 1, wherein the sealing pressure is less than 500 pounds per square inch.

* * * * *